(12) United States Patent
Yeldener et al.

(10) Patent No.: US 8,041,054 B2
(45) Date of Patent: Oct. 18, 2011

(54) SYSTEMS AND METHODS FOR SELECTIVELY SWITCHING BETWEEN MULTIPLE MICROPHONES

(75) Inventors: Suat Yeldener, Palatine, IL (US); David L. Barron, Scottsdale, AZ (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 573 days.

(21) Appl. No.: 12/262,188

(22) Filed: Oct. 31, 2008

(65) Prior Publication Data

US 2010/0111324 A1 May 6, 2010

(51) Int. Cl.
*H04R 3/00* (2006.01)
(52) U.S. Cl. .................. 381/92; 381/71.1; 381/94.1
(58) Field of Classification Search .............. 381/71.1, 381/92, 94.1
See application file for complete search history.

(56) References Cited

U.S. PATENT DOCUMENTS

| | | | |
|---|---|---|---|
| 6,505,057 B1 * | 1/2003 | Finn et al. ............... | 455/569.2 |
| 2003/0161485 A1 | 8/2003 | Smith | |

FOREIGN PATENT DOCUMENTS

| | | |
|---|---|---|
| EP | 0932142 | 7/1999 |
| GB | 2387499 | 10/2003 |

OTHER PUBLICATIONS

N.D. Degan, C. Prati, "Acoustic noise analysis and speech enhancement techniques for mobile radio applications," Signal Proc. vol. 15, pp. 43-56, 1988.
S. Nordholm, I. Claesson, B. Bengtsson, "Adaptive array noise suppression of hands-free speaker input in cars," IEEE Trans. Veh. Tech. vol. 42, pp. 514-518, Nov. 1993.
M. M. Goulding and J.S. Bird, "Speech enhancement for mobile telephony," IEEE Trans. Veh. Tech., vol. 39, pp. 316-326, Nov. 1990.
S. Affes and Y. Grenier, "Test of adaptive beam-formers for speech acquisition in cars," in Proc. 5th Int. Conf. Signal Processing Applications and Technology, Oct. 1994, pp. 154-159.
Y. Grenier, "A microphone array for car environments," in Proc. IEEE Int. Conf. Acoustic, Speech and Signal Processing (ICASSP 1992), 1992, pp. 305-308.
J.A. Rex and S.J. Elliot, "An Optimal microphone array for speech reception in a car," Signal Processing VII: Theories and Applications, pp. 1752-1755, 1994.
International Search Report for PCT/US2009/062892, filed Oct. 30, 2009.

\* cited by examiner

*Primary Examiner* — Marcos D. Pizarro

(57) ABSTRACT

Methods and systems for selectively switching between microphones in a plurality of microphones are disclosed, including providing a first state that corresponds to one or more microphones selected from the plurality of microphones. A subset of microphones may be selected from the plurality of microphones in response to determining an average power of an input signal for each of the plurality of microphones. A second state may be identified that includes at least one of the subset of microphones in response to evaluating the average powers of the input signals for the subset of microphones against a predetermined condition. A transition from the first state to the second state may be delayed in response to determining a transition delay time corresponding to the first state.

20 Claims, 5 Drawing Sheets

SYSTEMS AND METHODS FOR SELECTIVELY SWITCHING BETWEEN MULTIPLE MICROPHONES

BACKGROUND

The invention relates generally to the field of signal processing and more specifically to switching between microphones in microphone arrays.

SUMMARY

In one respect, disclosed is a method for selectively switching between microphones, the method comprising: providing a first state, wherein the first state corresponds to one or more microphones selected from a plurality of microphones; selecting a subset of microphones from the plurality of microphones in response to determining an average power of an input signal for each of the plurality of microphones; and identifying a second state that comprises at least one of the subset of microphones in response to comparing the average powers of the input signals for the subset of microphones against a predetermined condition.

In another respect, disclosed is a system for selectively switching between microphones, the system comprising: one or more processors; one or more memory units coupled to the one or more processors; the system being configured to: receive an input signal from each of a plurality of microphones; store information corresponding to a first state, wherein the first state corresponds to one or more of the plurality of microphones; select input signals for a subset of microphones from the plurality of microphones in response to determining an average power of an input signal for each of the plurality of microphones; and transition from the first state to a second state that comprises at least one of the subset of microphones in response to comparing the average powers of the input signals for the subset of microphones against a predetermined condition.

In yet another respect, disclosed is a computer program product stored on a computer operable medium, the computer program product comprising software code being effective to: provide a first state, wherein the first state corresponds to one or more microphones selected from a plurality of microphones; select input signals for a subset of microphones from the plurality of microphones in response to determining an average power of an input signal for each of the plurality of microphones; and transition from the first state to a second state that comprises at least one of the subset of microphones in response to evaluating the average powers of the input signals for the subset of microphones against a predetermined condition.

Numerous additional embodiments are also possible.

BRIEF DESCRIPTION OF THE DRAWINGS

Other objects and advantages of the invention may become apparent upon reading the detailed description and upon reference to the accompanying drawings.

Figure 1:
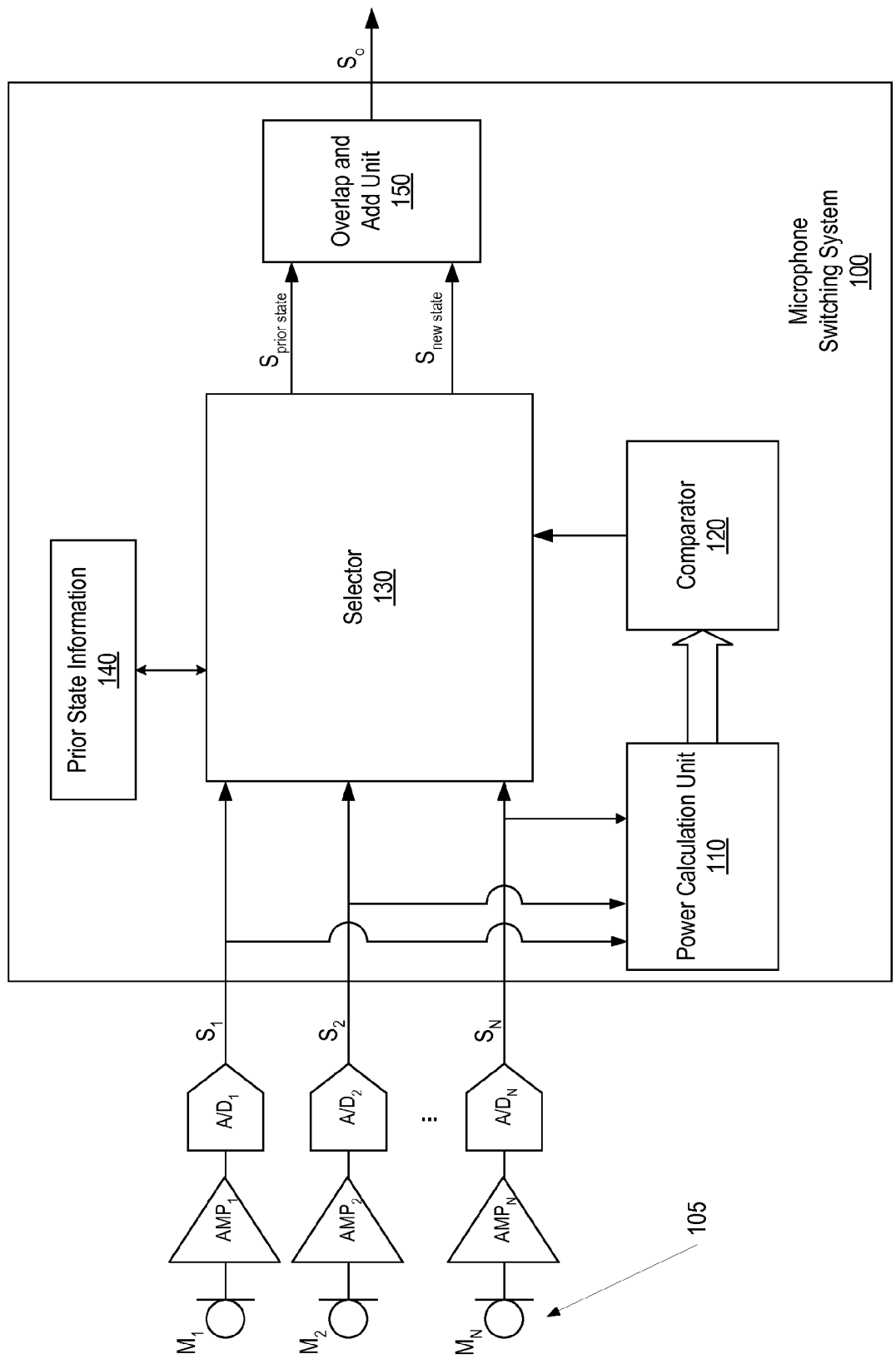
FIG. 1 is a block diagram illustrating a system for selectively switching between microphones in a plurality of microphones, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

FIG. 1 is a block diagram illustrating a system for selectively switching between microphones in a plurality of microphones, in accordance with some embodiments. Microphone switching system 100 is operable to receive input signals from microphone array 105. Microphone array 105 includes a plurality of microphones $M_n$, where $1 \leq n \leq N$. Various configurations of microphones may be used. While a linear array is depicted in FIG. 1, one of ordinary skill in the art will appreciate that the systems and methods described herein will work with any configurations that are different from linear. Operation of microphone switching system 100 does not require knowledge of the particular configuration of microphone array 105. In some embodiments, the distances between and relative positioning of the microphones may be independent. In some embodiments, the spatial distribution of the microphones may be predetermined. Various types of microphones may be employed. In some embodiments, one or more directional microphones may be utilized. In some embodiments, one or more omni-directional microphones may be utilized. In some embodiments, one or more directional microphones may be used in conjunction with one or more omni-directional microphones.

Each of the microphones in microphone array 105 may detect audio signals from a number of sources, including voice activity from near-end users, noise, and acoustic echo from speakers located in the vicinity of the microphones. A near-end user is a user who is located within the vicinity of the microphones. A far-end user is a user who is not located in the vicinity of the microphones. In some embodiments, microphone switching system 100 may be included in a vehicle in order to facilitate communication between near-end users in the vehicle and far-end users. For example, in some embodiments microphone switching system 100 may be utilized in a hands-free telephony system in a vehicle. In this case, a near-end user could be the driver of the vehicle or a passenger, and the far-end user could be an individual located in another vehicle. In such embodiments, the vehicle would include the various elements of system 100 as well as the plurality of microphones. The signal from each microphone $M_n$ may be amplified prior to subsequent processing. As shown in FIG. 1, for each microphone M, the signal from $M_n$ may be amplified by amplifier $AMP_n$ and passed through an analog-to-digital converter $A/D_n$ to provide a digital input signal $S_n$. The collection of input signals may be represented as:

$$S = \{S_1, S_2, S_3, \ldots, S_N\} \qquad \text{Eq. (1)}$$

During operation, microphone switching system 100 will receive input signals S and generate an output signal $S_0$ using a subset of the microphones making up microphone array 105. The subset of microphones that are used to generate the output signal corresponds to the state of the system at that time. The output signal of the system during any speech frame may generally be represented as a weighted combination of the input signals for the subset of selected microphones. In moving from one speech frame to the next, the state of the system may stay the same or change depending on a variety of conditions.

Power calculation unit 110 receives the input signals from microphone array 105 and computes an average power for each input signal $S_n$. In some embodiments, the long term average power for each input signal $S_n$ may be utilized and computed as:

$$P_0(n) = \alpha P_{-1}(n) + (1-\alpha)E_0(n); \; n=1,2,\ldots,N \qquad \text{Eq. (2)}$$

Here $P_0(n)$ and $P_{-1}(n)$ are the long term average powers for input signal $S_n$ at the current and previous speech frames, respectively. The coefficient $\alpha$ is a weighting factor having a value $0 \leq \alpha \leq 1$. A typical value used for $\alpha$ is $\alpha=0.85$. $E_0(n)$ represents the instantaneous average power for input signal $S_n$ at the current speech frame. In some embodiments, $E_0(n)$ may be computed as:

$$E_0(n) = \frac{1}{K} \sum_{k=0}^{K-1} S_n(k) S_n(k), \qquad \text{Eq. (3)}$$

where K corresponds to the number of samples in each speech frame. For example, K=80 samples for a 10 ms speech frame at a sampling rate of 8 kHz.

Comparator 120 receives the computed average powers $P_0(n)$ and identifies the microphones in microphone array 105 that will form the subset of microphones. In some embodiments, the number of microphones that are included in the subset of microphones may be chosen to be less than the total number of the plurality of microphones forming microphone array 105. In some embodiments, the selection of the subset of microphones may be based on the relative ordering of the average powers of the plurality of microphones. For example, if the total number of microphones in microphone array 105 is N, the number of microphones in the subset of microphones may be X, where $X \leq N$, and the criteria for selecting which of the N microphones gets selected may be: selecting the X microphones with the highest average powers. For example, if N=8 and X=4, the subset of microphones selected may correspond to the microphones in microphone array 105 with the four highest computed average powers.

Comparator 120 is further configured to compare the computed average powers for the subset of microphones against a predetermined condition. For example, if the total number of microphones is N and the subset of microphones includes X microphones ($X \leq N$), comparator 120 may identify J microphones ($J \leq X$) within the subset that satisfy the predetermined condition. In some embodiments, the predetermined condition may include comparing the differences between pairs of the computed average powers for the subset of microphones to one or more predetermined threshold values. In some embodiments, the predetermined condition may include comparing the difference between the highest computed average power and each of the computed average powers for the other microphones in the subset against one or more predetermined threshold values. In some embodiments, the threshold value may be expressed as a percentage of the highest computed average power.

For example, in some embodiments the number of microphones used for the subset of microphones may be two. In this case, comparator 120 receives the computed average powers $P_0(n)$ for each of the N microphones and determines the microphones having input signals with the highest computed average power ($P_0(A)$) and second highest computed average power ($P_0(B)$). The microphones corresponding to the highest and second highest computed average powers are designated as $M_A$ and $M_B$, respectively. The input signals corresponding to these microphones are designated as $S_A$ and $S_B$, respectively. In this case, the predetermined condition may be comparing the difference between $P_0(A)$ and $P_0(B)$ to a predetermined threshold value. Comparator 120 computes the difference between the computed average powers for these signals and compares the difference to a predetermined threshold value.

Selector 130 is shown receiving input signals S from microphone array 105. Selector 130 is configured to select input signals corresponding to the subset of microphones identified by comparator 120. Selector 130 is further configured to choose between or combine the selected input signals to form $S_{new\ state}$ based on the results of the comparison undertaken by comparator 120 of the computed average powers to the predetermined condition. $S_{new\ state}$ is the output signal corresponding to the new state of the system.

In the example where the number of microphones forming the subset of microphones is chosen to be two microphones, selector 130 is configured to select input signals $S_A$ and $S_B$ in response to receiving output from comparator 120. Selector 130 is further configured to choose between or combine input signals $S_A$ and $S_B$ to form $S_{new\ state}$ based on the results of the comparison undertaken by comparator 120 of the difference in computed average powers to the threshold value. When the difference between the computed average powers for $S_A$ and $S_B$ is greater than the threshold value, the new state is represented only by microphone $M_A$. This corresponds to the situation where a significant power difference is detected between the input signals for microphones $M_A$ and $M_B$. In this case, the output signal corresponding to the new state will be set equal to the input signal for microphone $M_A$. That is, $$S_{new\ state} = S_A. \qquad \text{Eq. (4)}$$

If the difference between the computed average powers for $S_A$ and $S_B$ is less than or equal to the threshold value, selector 130 will combine $S_A$ and $S_B$ to form the output signal for the new state. This corresponds to the situation where the power levels for microphones $M_A$ and $M_B$ are similar. For example, this may occur in a scenario where one person closer to microphone $M_A$ and another person closer to microphone $M_B$ speak at the same time. The combined signal may be normalized by the signal energy for microphone $M_A$ in the current speech frame. During this normalization process, an interpolation procedure between the previous speech frame's energy and the current speech frame's energy may be applied in order to provide a smooth transition from one frame to the next. In this case, the output signal $S_{new\ state}$ may be formulated as:

$$S_{new\ state}(k) = \left( \frac{S_A(k) + S_B(k)}{\sqrt{\frac{1}{K}\sum_{t=0}^{K}(S_A(t) + S_B(t))^2}} \right)\left( E_{-1} + \frac{(E_0 - E_{-1})k}{K} \right), \quad \text{Eq. (5)}$$

where k=0,1,...,K−11 and $E_0$ and $E_{-1}$ are the energies of the current and previous speech frames, respectively.

Returning to FIG. 1, prior state information 140 stores and shares information with selector 130 related to the state of the system in the prior speech frame. Such information may include the subset of microphones from microphone array 105 that were used in determining the output signal for the prior state. Selector 130 is configured to generate an output signal in the current speech frame using information received from prior state information 140 that corresponds to the subset of microphones used for the state of the system in the prior speech frame. This output signal is designated as $S_{prior\ state}$ in FIG. 1. In some embodiments, the new state may be the initial state of the system upon start up. In this case, the prior state is a null state.

Prior state information 140 may also store a transition delay time or hangover time associated with the prior state. The hangover time is a control parameter that may be used by selector 130 to delay transitioning to the new state. In some embodiments, selector 130 is configured to transmit only $S_{prior\ state}$ if the hangover time for the prior state is not equal to zero. The hangover time may be measured in units of frames. In some embodiments, a maximum hangover time may be set.

As shown in FIG. 1, overlap and add unit 150 is configured to receive the output signals $S_{prior\ state}$ and $S_{new\ state}$ from selector 130 and generate the output signal for microphone switching system 100. The output signal for the system is designated as $S_O$ in FIG. 1. Overlap and add unit 150 may be used to smooth the transition from the prior state to the new state. In some embodiments, overlap and add unit 150 may use the following formulation for the transition from the prior state to the new state:

$$S_O(k) = S_{prior\ state}(k)W_{prior\ state}(k) + S_{new\ state}(k)W_{new\ state}(k) \quad 0 \leq k < L \quad \text{Eq. (6)}$$

$$S_O(k) = S_{new\ state}(k) \quad L \leq k < K \quad \text{Eq. (7)}$$

Here, $L \leq K$ and $W_{prior\ state}(k)$ and $W_{new\ state}(k)$ are windows functions for the prior state and new state such that the output signal will initially be in the prior state and finally be in the new state. In some embodiments, the window functions may be represented as:

$$W_{prior\ state}(k) = 1 - \frac{k}{K} \quad 0 \leq k < L \quad \text{Eq. (8)}$$

$$W_{new\ state}(k) = \frac{k}{K} \quad 0 \leq k < L \quad \text{Eq. (9)}$$

Once a new state is selected, information regarding the new state will be sent to prior state information 140 by selector 130.

While specific embodiments of various processing blocks and units for microphone switching system 100 have been described above, one or ordinary skill in the art will appreciate that various alternative designs may be used for these processing blocks and units, and this is within the scope of the invention. Moreover, certain processing blocks and units may be omitted and/or different processing blocks and units may be added.

Figure 2:
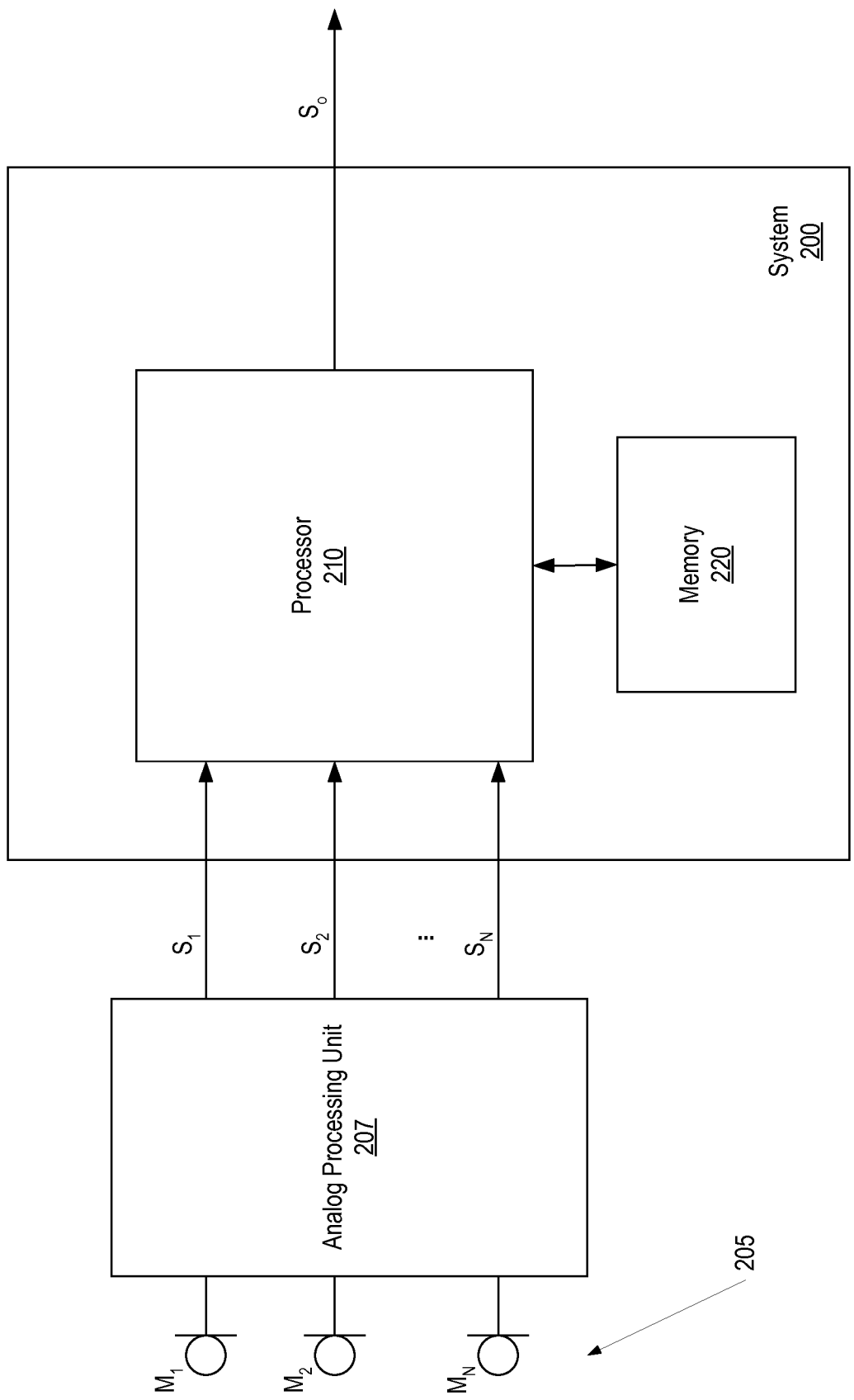
FIG. 2 is a block diagram illustrating a system for selectively switching between microphones in a plurality of microphones, in accordance with some embodiments.

FIG. 2 is a block diagram illustrating a system for selectively switching between microphones in a plurality of microphones, in accordance with some embodiments. Microphone switching system 200 is operable to receive input signals from microphone array 205 and generate an output signal $S_O$ using a subset of the microphones making up microphone array 205. Microphone array 205 includes a plurality of microphones $M_n$, where $1 \leq n \leq N$. The input signals from microphone array 205 may undergo processing via analog processing unit 207 to provide a digital input signal $S_n$ for each microphone $M_n$. Analog processing unit 207 may include one or more amplifiers and one or more analog-to-digital converters, such as amplifiers $AMP_n$ and analog-to-digital converters $A/D_n$ depicted in FIG. 1.

As shown in FIG. 2, system 200 may include processor 210 and memory 220 coupled to processor 210. Processor 210 may be designed to implement various processing operations for selectively switching between microphones in microphone array 205, such as the operations carried out by the processing blocks and units shown in FIG. 1. Processor 210 may include one or more processors. Memory 220 provides storage for information for use by processor 210. In some embodiments, memory 220 may include prior state information 140. Memory 220 may include one or more memory units. In some embodiments, system 200 may be included in vehicle. In such cases, the vehicle may include the processors and memory units as well as the microphone array and analog processing unit.

Figure 3:
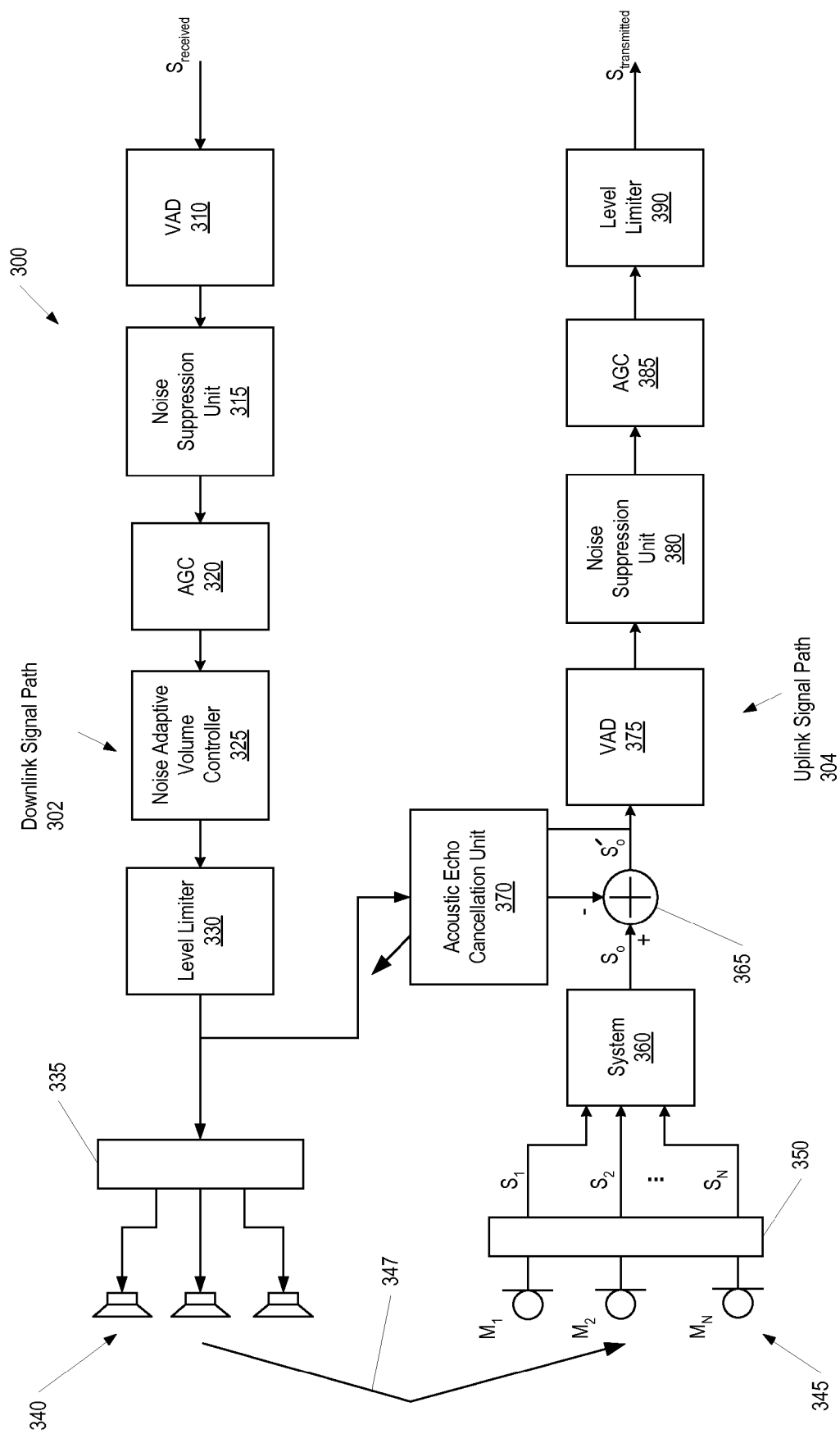
FIG. 3 is a block diagram illustrating a system for canceling echo and suppressing noise, in accordance with some embodiments.

FIG. 3 is a block diagram illustrating a system for canceling echo and suppressing noise, in accordance with some embodiments. Echo cancellation and noise suppression system 300 includes downlink signal path 302 and uplink signal path 304.

Downlink signal path 302 includes various blocks for receiving and processing an incoming digital signal $S_{received}$ and converting the incoming signal to an audio signal for output to speakers located in the vicinity of near-end users. Incoming signal $S_{received}$ may include audio activity from a far end source such as speech activity from a far-end user.

As shown in FIG. 3, downlink signal path 302 may include voice activity detector (VAD) 310, noise suppression unit 315, automatic gain control (AGC) 320, adaptive volume controller 325, and level limiter 330. VAD 310 may receive incoming signal $S_{received}$ and detect for the presence of far-end speech activity. In some embodiments, the incoming signal may be classified as speech or non-speech depending on whether speech activity is detected. AGC 320 may be used in downlink signal path 302 to automatically adjust the speech level of the incoming signal received from noise suppression unit 315 to a desired value. Downlink signal path 302 may also include adaptive volume controller 325 and level limiter 330 for regulating variations in the amplitude of sound produced by speakers 340 due to variations in the amplitude of the incoming signal.

Analog processing unit 335 is operable to convert the input signal received from level limiter 330 to an analog signal and distribute the analog signal to speakers 340 for output as sound to near-end users. Analog processing unit 335 may also amplify the converted signal prior to distribution to speakers 340.

Uplink signal path 304 includes various blocks for receiving and processing audio input signals from microphone array 345 and generating an outgoing signal $S_{transmitted}$. The audio signals received by microphone array 345 may include voice activity from near-end users, noise, and acoustic echo 347 from speakers 340. As shown in FIG. 3, audio input signals received from microphone array 345 may be amplified and converted to digital signals $S_n(1 \leq n \leq N)$ by analog processing unit 350. System 360 is operable to receive input signals from microphone array 345 and generate an output signal $S_O$ using a subset of the microphones making up microphone array 345. System 360 is a microphone switching system that may be used to selectively switch between microphones in microphone array 345 using the functional blocks displayed in FIG. 1.

Output signal $S_O$ may undergo further processing to reduce echo and noise effects in the remaining blocks shown in FIG. 3. Summer 365 may subtract an echo correction signal provided by acoustic echo canceller 370 from $S_O$ to provide an intermediate output signal $S_O'$ VAD 310 may receive intermediate output signal $S_O'$ and detect for the presence of near-end speech activity. In some embodiments, intermediate output signal $S_O'$ may be classified as speech or non-speech depending on whether speech activity is detected. Noise suppression 380 may be used to reduce noise present in the intermediate input signal using noise reduction algorithms known to those of ordinary skill in the art. In some embodiments, noise suppression unit 380 may utilize adaptive noise cancellation techniques. In some embodiments, noise suppression unit 380 may utilize adaptive or fixed beam-forming techniques. Uplink signal path 304 may also employ AGC 385 and level limiter 390 to further improve the quality of the outgoing signal $S_{transmitted}$.

Figure 4:
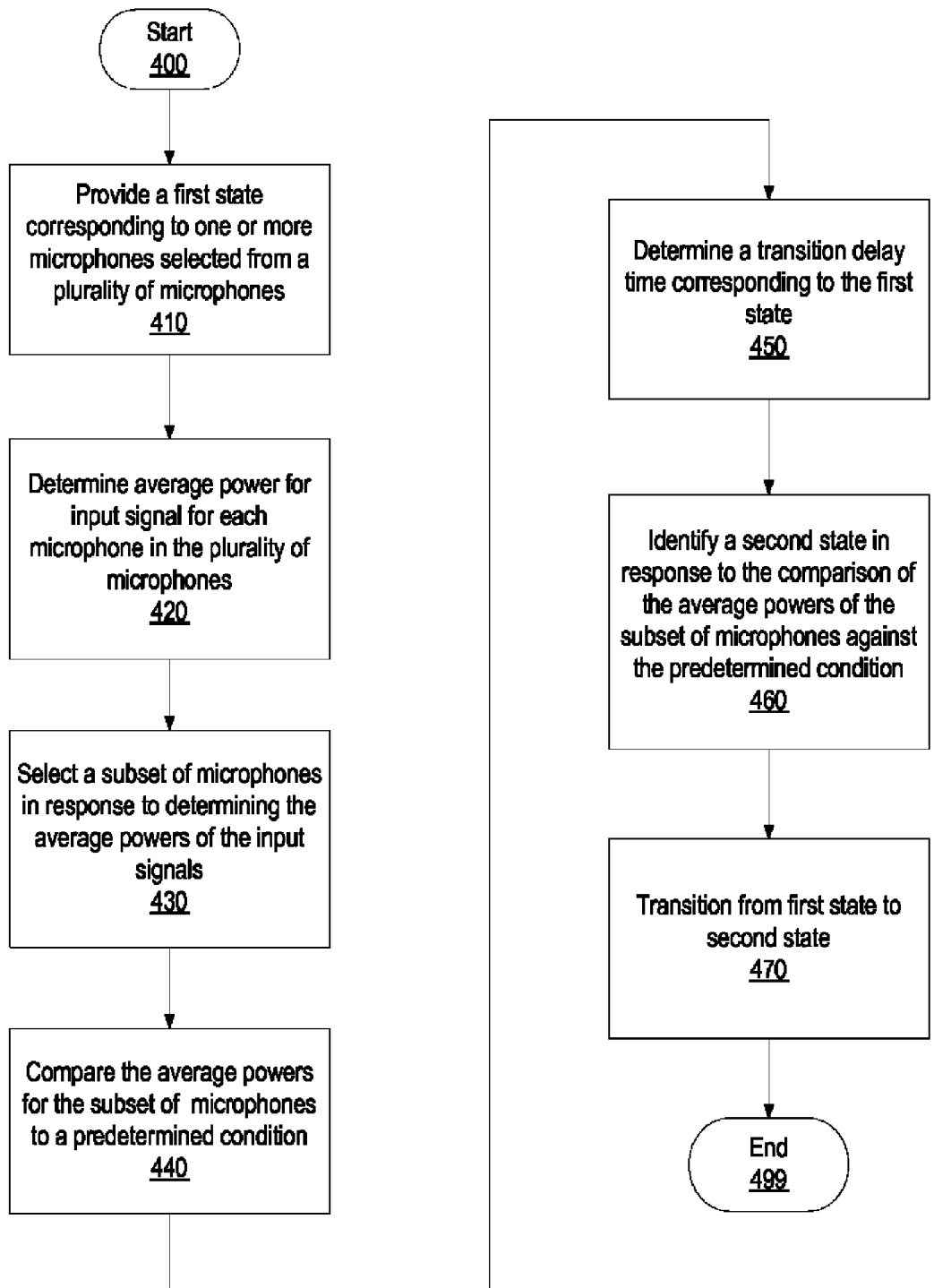
FIG. 4 is a flow diagram illustrating a method for selectively switching between microphones in a plurality of microphones, in accordance with some embodiments.

FIG. 4 is a flow diagram illustrating a method for selectively switching between microphones in a plurality of microphones, in accordance with some embodiments. The method depicted in FIG. 4 may include one or more of the operations shown in blocks 410-470. In some embodiments, the method shown here may be performed by the microphone switching system shown in FIG. 2. Processing begins at 400. In block 410 a first state is provided that corresponds to one more microphones selected from a plurality of microphones. Each microphone in the plurality of microphones is operable to generate an input signal for a system that is operable to process such input signals. The first state represents a subset of microphones from the plurality of microphones whose input signals are combined to form the input signal for the plurality of microphones at a given point in time.

At block 420 the average power is determined for the input signal for each microphone in the plurality of microphones. The average power for each input signal may be used as a measure of near-end speech activity for the associated microphone in the plurality of microphones. A subset of microphones from the plurality of microphones are selected at block 430 based on the average powers determined for the microphones. The subset of microphones may be used to form a second state. The second state represents a subset of microphones from the plurality of microphones whose input signals are used to form the input signal for the plurality of microphones at a point in time that is later than the time of the first state.

After selection of the subset of microphones, the average powers for the subset of microphones are compared against a predetermined condition at block 440. In some embodiments, the predetermined condition may be the predetermined condition discussed above with respect to FIG. 1. The nature of the second state will be determined based on this comparison.

At block 450, a transition delay time is determined that corresponds to the first state. The transition delay time may be used to delay the transition of the system from the first state to the second state. At block 460, a second state is identified in response to the comparison made at block 440 of the average powers of the subset of microphones against the predetermined condition. At block 470, the system may be transitioned to the second state from the first state. As noted above, the comparison of the average powers of the subset of microphones to a predetermined condition determines the second state. The transition delay time determines whether the transition to the second state goes forward or is delayed. Processing subsequently ends at 499.

Figure 5:
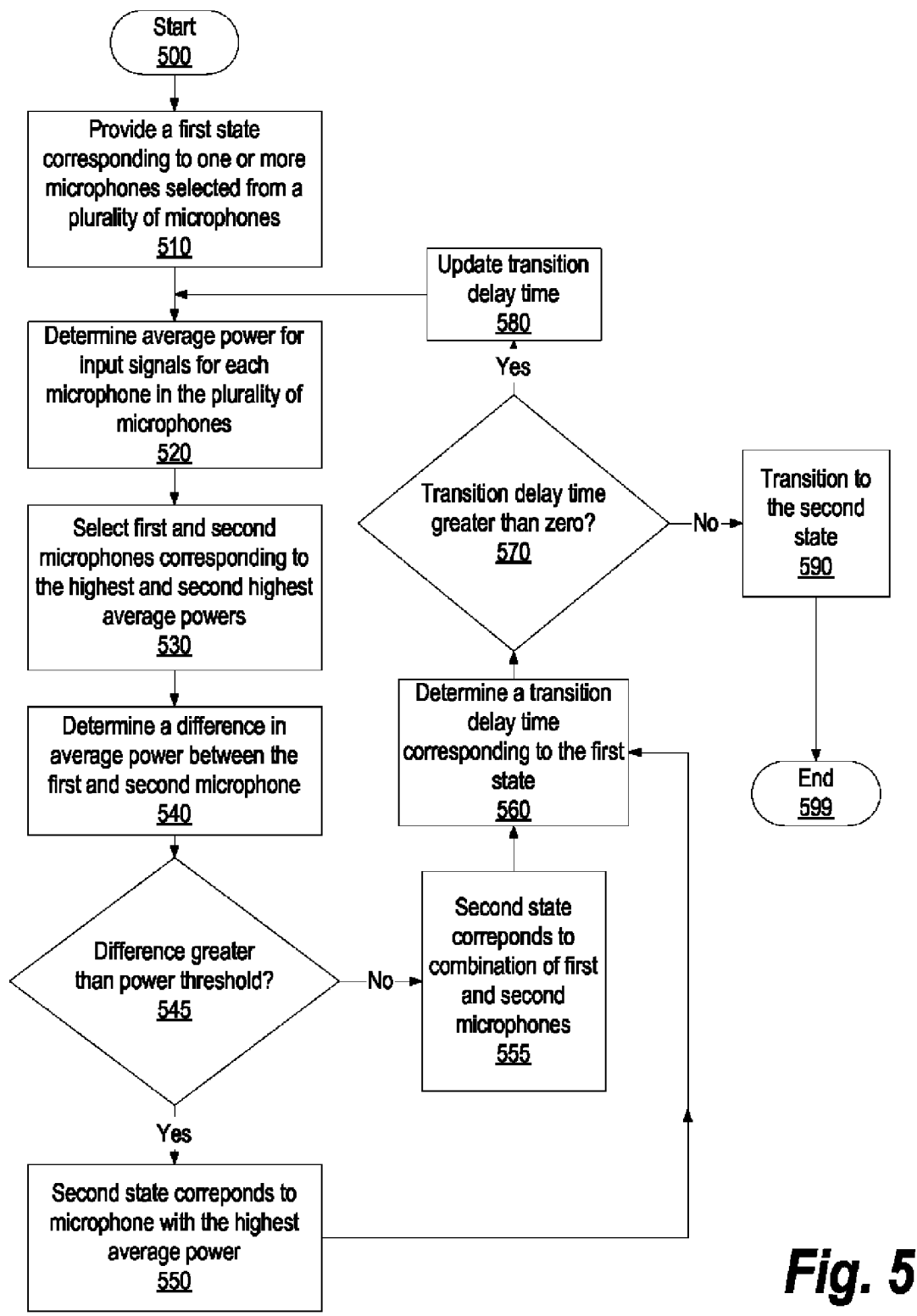
FIG. 5 is a flow diagram illustrating a method for selectively switching between microphones in a plurality of microphones, in accordance with some embodiments.

FIG. 5 is a flow diagram illustrating a method for selectively switching between microphones in a plurality of microphones, in accordance with some embodiments. For the illustrated embodiment, the number of microphones chosen for the subset of microphones is two. In some embodiments, the method shown here may be performed by the system shown in FIG. 2. Processing begins at 500 and continues at block 510 where a first state is provided that corresponds to one more microphones selected from a plurality of microphones. In some embodiments, the plurality of microphones may be a microphone array such as microphone array 205 depicted in FIG. 2. Each microphone in the plurality of microphones is operable to generate an input signal for a system that is operable to process such input signals. In some embodiments, such systems may include full-duplex hands-free communications systems, such as hands-free telephony systems used in vehicles. More generally, such systems may include any telecommunications system in which microphones are used to pick up acoustic signals. During operation, the system will be in a first state at a first time and a second state at a second time that is later than the first time. In some embodiments, the first state may initially be a null state. This may be the case, for example, when the system is initially started up. The state of the system will generally correspond to the subset of microphones of the plurality of microphones whose input signals are used to generate the input signal of the system at a given time. In some embodiments, the time may be measured in terms of speech frames with the first state corresponding to the state of the system in the prior speech frame and the second state corresponding to the state of the system in the current speech frame. Depending on the conditions of the system at a given time, the second state may remain the same as the first state or be different from the first state.

At block 520 the average powers for the input signal for each of the plurality of microphones is computed. In some embodiments, the average powers for the input signals may be determined using equations (2) and (3) above.

Processing continues at block 530 where first and second microphones are selected based on the average powers determined at block 520. The microphone with the highest average power is selected as the first microphone. The microphone with the next highest average power is selected as the second microphone. The first and second microphones will be used as the basis for the formation of the second state. The second state represents a subset of microphones from the plurality of microphones whose input signals are used to form the input signal for the plurality of microphones at a point in time that is later than the time of the first state.

After selection of the first and second microphones, the difference between the average powers for these two microphones is determined at block 540. The nature of the second state will be determined based on the relative difference in the powers levels between the first and second microphones. The average power difference is compared to a power threshold value at block 545. If the power difference is greater than the power threshold, the second state will correspond to the first microphone as depicted at block 550. This corresponds to the situation where a significant power difference is detected between the input signals for the first and second microphones. Alternatively, if the power difference is less than or equal to the power threshold, the second state will correspond to a combination of the first and second microphones as depicted at block 555. This corresponds to the situation where the power levels for the first and second microphones are similar. In some embodiments, the condition for determining whether to select one or both of the first and second microphones for the second state may be whether the power difference is greater than or equal to the power threshold.

Returning to FIG. 5, a transition delay time corresponding to the first state is determined at block 560. The transition delay time may be used to delay the transition of the system from the first state to the second state. The transition delay time is a control parameter that may be used to prevent the system from prematurely switching between states. For example, if the system has been in a first state for a significant amount of time, a spike in power over a relatively short time period may inadvertently result in switching to a second state that is different from the first state. To prevent this situation, a transition delay time may be used. The transition delay time for the first state may initially be set to zero and increased if the state of the system remains in the first state over a period of time. Alternatively, if the first state has a non-zero transition delay time, such transition delay time may be reduced if the state of the system does not remain in the first state for a predetermined time. In some embodiments, the transition delay time may be measured in units of speech frames. The transition delay time for the first state will initially be zero. For each speech frame that the state of the system remains in the first state, the transition delay time for the first state will be increased by one speech frame. In some embodiments, a maximum transition delay time may be set. For example, the maximum delay time may be set at five speech frames. Alternatively, for each speech frame in which the state of the system does not remain in the first state, the transition delay time may be reduced down to a minimum of zero.

At block 570 the transition delay time is examined to determine if it is greater than zero. If the transition delay time for the first state is greater than zero, processing continues at block 580 where the transition delay time for the first state will be updated. The transition delay time will be increased if the second state coincides with the first state. This corresponds to the situation where the system was in the first state in the prior speech frame and remains in the first state in the current speech frame. Alternatively, the transition delay time will be decreased if the second state is different from the first state. Following the updating of the transition delay time for the first state, processing returns to block 520.

If the transition delay time for the first state is equal to zero, processing continues at block 590 where the system transitions from the first state to the second state. In some embodiments, an overlap and add technique such as that discussed above with respect to FIG. 1 may be used.

Those of skill will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A method for selectively switching between microphones, the method comprising:
   providing a first state, wherein the first state corresponds to one or more microphones selected from a plurality of microphones;
   selecting a subset of microphones from the plurality of microphones in response to determining an average power of an input signal for each of the plurality of microphones; and
   identifying a second state that comprises at least one of the subset of microphones in response to comparing the average powers of the input signals for the subset of microphones against a predetermined condition.

2. The method of claim 1, wherein the subset of microphones comprises a first microphone and a second microphone, wherein the average powers of the input signals for the first and second microphones correspond to the highest and second highest average powers determined for the input signals of each of the plurality of microphones, and wherein the comparing the average powers of the input signals for the subset of microphones against a predetermined condition comprises comparing a difference between the average powers of the input signals for the first and a second microphones to a power threshold.

3. The method of claim 1, further comprising transitioning from the first state to the second state.

4. The method of claim 3, further comprising delaying the transitioning to the second state in response to determining a transition delay time corresponding to the first state.

5. The method of claim 1, wherein the subset of microphones comprises a microphone from the plurality of microphones corresponding to the input signal having the highest average power.

6. The method of claim 5, further comprising setting the second state to correspond only to the microphone from the plurality of microphones corresponding to the input signal having the highest average power in response to the predetermined condition being satisfied.

7. The method of claim 5, further comprising setting the second state to correspond to a combination of the microphone from the plurality of microphones corresponding to the input signal having the highest average power and at least one other microphone selected from the subset of microphones in response to the predetermined condition not being satisfied.

8. A system for selectively switching between microphones, the system comprising:
one or more processors;
one or more memory units coupled to the one or more processors;
the system being configured to:
receive an input signal from each of a plurality of microphones;
store information corresponding to a first state, wherein the first state corresponds to one or more of the plurality of microphones;
select input signals for a subset of microphones from the plurality of microphones in response to determining an average power of an input signal for each of the plurality of microphones; and
transition from the first state to a second state that comprises at least one of the subset of microphones in response to comparing the average powers of the input signals for the subset of microphones against a predetermined condition.

9. The system of claim 8, wherein the system is further configured to determine a transition delay time corresponding to the first state and delay the transition to the second state in response to determining the transition delay time.

10. The system of claim 8, wherein the subset of microphones comprises a first microphone and a second microphone, wherein the average powers of the input signals for the first and second microphones correspond to the highest and second highest average powers determined for the input signals of each of the plurality of microphones, and wherein the comparing the average powers of the input signals for the subset of microphones against a predetermined condition comprises comparing a difference between the average powers of the input signals for the first and a second microphones to a power threshold.

11. The system of claim 8, further comprising a vehicle comprising the plurality of microphones, the one or more processors, and the one or more memory units.

12. The system of claim 8, wherein the subset of microphones comprises a microphone from the plurality of microphones corresponding to the input signal having the highest average power.

13. The system of claim 12, wherein the second state corresponds only to the microphone from the plurality of microphones corresponding to the input signal having the highest average power in response to the predetermined condition being satisfied.

14. The system of claim 12, wherein the second state corresponds to a combination of the microphone from the plurality of microphones corresponding to the input signal having the highest average power and at least one other microphone selected from the subset of microphones in response to the predetermined condition not being satisfied.

15. A computer program product stored on a computer operable medium, the computer program product comprising software code being effective to:
provide a first state, wherein the first state corresponds to one or more microphones selected from a plurality of microphones;
select input signals for a subset of microphones from the plurality of microphones in response to determining an average power of an input signal for each of the plurality of microphones; and
transition from the first state to a second state that comprises at least one of the subset of microphones in response to evaluating the average powers of the input signals for the subset of microphones against a predetermined condition.

16. The computer program product of claim 15, being further effective to determine a transition delay time corresponding to the first state and delay the transition to the second state in response to determining the transition delay time.

17. The computer program product of claim 15, wherein the subset of microphones comprises a first microphone and a second microphone, wherein the average powers of the input signals for the first and second microphones correspond to the highest and second highest average powers determined for the input signals of each of the plurality of microphones, and wherein the comparing the average powers of the input signals for the subset of microphones against a predetermined condition comprises comparing a difference between the average powers of the input signals for the first and a second microphones to a power threshold.

18. The computer program product of claim 15, wherein the subset of microphones comprises a microphone from the plurality of microphones corresponding to the input signal having the highest average power.

19. The computer program product of claim 18, wherein the second state corresponds only to the microphone from the plurality of microphones corresponding to the input signal having the highest average power in response to the predetermined condition being satisfied.

20. The computer program product of claim 18, wherein the second state corresponds to a combination of the microphone from the plurality of microphones corresponding to the input signal having the highest average power and at least one other microphone selected from the subset of microphones in response to the predetermined condition not being satisfied.

* * * * *